(12) United States Patent
Okano

(10) Patent No.: US 7,568,914 B2
(45) Date of Patent: Aug. 4, 2009

(54) HEAT TREATMENT APPARATUS

(75) Inventor: Hideki Okano, Miyazaki (JP)

(73) Assignee: Fujitsu Hitachi Plasma Display Limited, Miyazaki (JP)

(*) Notice: Subject to any disclaimer, the term of this patent is extended or adjusted under 35 U.S.C. 154(b) by 141 days.

(21) Appl. No.: 11/641,714

(22) Filed: Dec. 20, 2006

(65) Prior Publication Data
US 2008/0008976 A1 Jan. 10, 2008

(30) Foreign Application Priority Data
Jul. 10, 2006 (JP) .............................. 2006-189194

(51) Int. Cl.
F27B 9/20 (2006.01)
(52) U.S. Cl. ........................ 432/121; 432/128; 432/143; 432/144
(58) Field of Classification Search ................. 432/121, 432/128, 133, 135, 136, 143, 144
See application file for complete search history.

(56) References Cited

U.S. PATENT DOCUMENTS

| | | | | |
|---|---|---|---|---|
| 1,602,721 A | * | 10/1926 | Straight | 432/77 |
| 1,711,910 A | * | 5/1929 | Straight | 432/32 |
| 3,820,946 A | * | 6/1974 | Miyoshi et al. | 432/121 |
| 4,260,371 A | * | 4/1981 | O'ffill | 432/82 |
| 5,851,941 A | * | 12/1998 | Hanzawa | 501/88 |
| 6,283,748 B1 | * | 9/2001 | Orbeck et al. | 432/126 |
| 6,623,269 B2 | * | 9/2003 | Tsutsui et al. | 432/128 |

FOREIGN PATENT DOCUMENTS

| | | |
|---|---|---|
| JP | 53 (1978)-42205 | 4/1978 |
| JP | 58 (1983)-7862 | 7/1981 |
| JP | 58 (1983)-16897 | 7/1981 |
| JP | 11-25854 | 1/1999 |

* cited by examiner

Primary Examiner—Gregory A Wilson
(74) Attorney, Agent, or Firm—Staas & Halsey LLP

(57) ABSTRACT

A heat treatment apparatus includes a heating furnace including a tunnel-shaped heating space for heating an object to be heated, the heating space having an inlet port and an outlet port formed at both ends thereof; a transporting unit transporting the object to the outlet port when the object is brought into the heating space through the inlet port; a heating unit heating the object that is being transported; and a gas-flow generation unit forming a gas flow that flows in a transporting direction of the object in the heating space, wherein the heating space has a cross-section orthogonal to the transporting direction of the object, the cross-section is changed in area along the transporting direction of the object.

7 Claims, 5 Drawing Sheets

HEAT TREATMENT APPARATUS

CROSS-REFERENCE TO RELATED APPLICATION

This application is related to Japanese patent application No. 2006-189194 filed on Jul. 10, 2006 whose priority is claimed under 35 USC §119, the disclosure of which is incorporated by reference in its entirety.

BACKGROUND OF THE INVENTION

1. Field of the Invention

The present invention relates to a general industrial heat (thermal) treatment apparatus that carries out a heat treatment on an object to be heated and, for example, to a heat treatment apparatus that carries out a drying process and a calcining process in a manufacturing process of a plasma display panel (PDP).

2. Description of the Related Art

A conventional PDP is manufactured by the steps of; making a front substrate by forming display electrodes on a glass substrate and laminating a dielectric layer and a protective layer over these display electrodes; making a back substrate by forming address electrodes on another glass substrate and forming a dielectric layer, partition walls and a phosphor layer on these address electrodes; and bonding these front substrate and back substrate to each other in a manner so as to allow the display electrodes and the address electrodes to intersect with each other. Here, in each of the processes in which the display electrodes and the address electrodes, the dielectric layer, the partition walls as well as the phosphor layer are formed, after a paste layer has been formed on a substrate, this paste layer is heated so as to be dried and calcined (for example, see Japanese Patent Application Laid-Open No. HEI 11(1999)-25854).

FIG. 7 is a schematic drawing that shows a conventional heating furnace 101 of a continuous type, and corresponds to a chart indicating a distribution of the furnace temperature in which positions in this heating furnace are plotted on the axis of abscissas, with substrate temperatures plotted on the axis of ordinates.

As shown in FIG. 7, the conventional heating furnace 101 is constituted by a temperature-raising unit 102, a temperature-retaining unit 103 and a temperature-lowering unit 104, and the respective units includes furnace chambers 105. In the heating furnace 101, a substrate (glass substrate) 111, used as an object to be heated, is moved in a direction of arrow 112, and allowed to pass through the temperature-raising unit 102, the temperature-retaining unit 103 and the temperature-lowering unit 104. The temperature-raising unit 102 is a unit for raising the temperature of the substrate 111 from room temperature to a temperature T, the temperature-retaining unit 103 is a unit for retaining the substrate 111 at the temperature T, and the temperature-lowering unit 104 is a unit for cooling the substrate 111 from the temperature T to the room temperature.

FIG. 8 is a schematic drawing that indicates the structure of the furnace chamber 105 of FIG. 7 and the state in which a heat treatment is actually carried out. In general, the area of a cross-section orthogonal to a transporting direction 112 of the substrate 111 is kept constant, without being changed in the transporting direction.

The furnace is used as a gas flow path in order to introduce a combustion gas thereto, discharge gases generated through the combustion, or control an atmosphere in the furnace.

However, the conventional heat treatment apparatus has the following problems.

For example, in an attempt to allow a gas to quickly flow from a certain position in the furnace to a certain further position therein, since an energy loss occurs due to a fluid resistance in the flow passage on the way, it is necessary to raise the initial velocity sufficiently. For this reason, the amount of gas supply needs to be increased, and the performance of the gas introducing mechanism needs to be improved.

In contrast, in an attempt to positively discharge burnt gases flowing through the furnace at a certain position in the furnace, the amount of discharge needs to be increased, and the discharging mechanism needs to be enlarged so as to increase the discharging efficiency. Moreover, when an object to be heated is located on the downstream side of the furnace, the quality of the object might be impaired due to a leak of discharged burning gas onto the downstream side.

SUMMARY OF THE INVENTION

The present invention provides a heat treatment apparatus comprising: a heating furnace including a tunnel-shaped heating space for heating an object to be heated, the heating space having an inlet port and an outlet port formed at both ends thereof; a transporting unit transporting the object to the outlet port when the object is brought into the heating space through the inlet port; a heating unit heating the object that is being transported; and a gas-flow generation unit forming a gas flow that flows in a transporting direction of the object in the heating space, wherein the heating space has a cross section orthogonal to the transporting direction of the object, the cross section is changed in area along the transporting direction of the object.

In accordance with the present invention, since the heating space has a structure in which the area of the cross-section orthogonal to the transporting direction of the object is changed along the transporting direction, a gas introduced into the furnace is allowed to have a gradually increased velocity by gradually narrowing the flow path. With this arrangement, the combustion can be completed in a shorter period of time without increasing an amount of use of the gas to be introduced so that the processing efficiency can be improved. Moreover, the quality improvement of the object can be expected. In the case when the gases generated from the object are discharged from a certain position on the downstream side, by gradually widening the flow path, the generated gases are allowed to have a gradually decreased flow velocity, and consequently easily discharged from the discharging mechanism. Thus, it becomes possible to effectively prevent the burnt gases from flowing to the further downstream side. Even when an object to be heated is located on the downstream side, it is possible to prevent the degradation in quality due to contact with the generated gases. Moreover, since the gas concentration is gradually decreased by expanding the flow path, it also becomes possible to prevent contaminations inside the furnace, such as dew condensation.

DETAILED DESCRIPTION OF THE PREFERRED EMBODIMENTS

A heat treatment apparatus of the present invention comprises: a heating furnace including a tunnel-shaped heating space for heating an object to be heated, the heating space having an inlet port and an outlet port formed at both ends thereof; a transporting unit transporting the object to the outlet port when the object is brought into the heating space through the inlet port; a heating unit heating the object that is being transported; and a gas-flow generation unit forming a gas flow that flows in a transporting direction of the object in the heating space, wherein the heating space has a cross-section orthogonal to the transporting direction of the object, the cross-section is changed in area along the transporting direction of the object.

The gas-flow generation unit may comprise an introducing unit disposed near the inlet port to introduce a gas into the heating space and a discharging unit disposed near the outlet port to discharge a gas from the heating space.

The cross-section may be gradually decreased in area from the inlet port to a predetermined position in the heating space, and is also gradually increased in area from the predetermined position toward the outlet port.

The object may be an object that generates a gas when heated, and the object generates a maximum amount of gas at the predetermined position.

A heat treatment apparatus of the present invention comprises: a heating furnace provided with a first furnace chamber, a second furnace chamber and a third furnace chamber that are connected in series with one after another, each furnace chamber including: a tunnel-shaped heating space; an inlet port and an outlet port for an object to be heated, the inlet and outlet ports formed at both ends of the heating space; a transporting unit transporting the object from the inlet port to the outlet port; a heating unit heating the object that is being transported; and a gas-flow generation unit forming a gas flow that flows in a transporting direction of the object in the heating space, wherein each of the first, second and third furnace chambers has a cross-section orthogonal to the transporting direction of the object and the cross-section of the first furnace chamber is changed in area along the transporting direction, and each cross-section of the second and third furnace chamber, is constant in area along the transporting direction.

Figure 1:
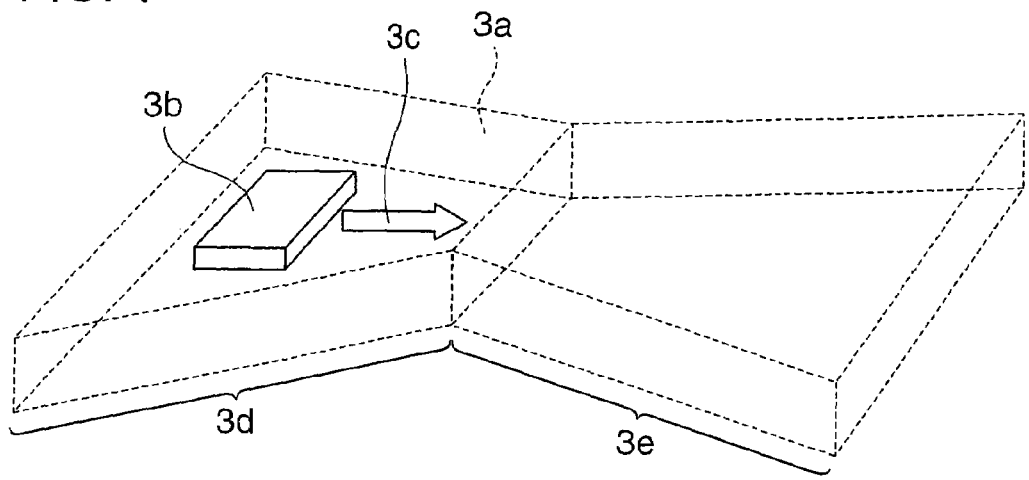
FIG. 1 is an explanatory drawing that shows an essential portion indicating a principle of the present invention.
Figure 2:
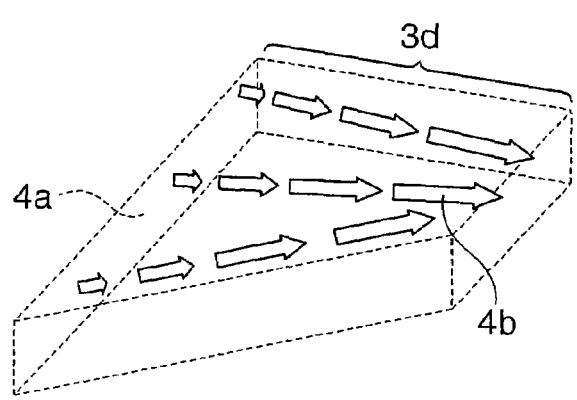
FIG. 2 is an explanatory drawing that shows an essential portion indicating the principle of the present invention.
Figure 3:
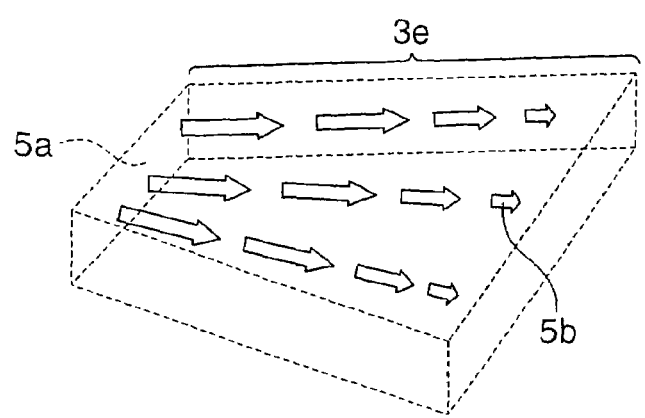
FIG. 3 is an explanatory drawing that shows an essential portion indicating the principle of the present invention.

FIG. 1 shows a principle structure of a heat treatment apparatus in accordance with the present invention. FIG. 2 shows a state of a gas flow when a gas is introduced into a furnace. FIG. 3 shows a state of a gas flow when a gas generated in the furnace is discharged.

FIG. 1 shows a side wall face 3a of a furnace, an object 3b to be heated, a transporting direction 3c of the object 3b, a range 3d in which a gas is introduced, and a range 3e from which the gas is discharged.

FIG. 2, which shows the range 3d in FIG. 1, indicates a state of a gas flow when the gas is introduced into the furnace. FIG. 2 shows a gas introducing surface 4a of the furnace and velocity vectors 4b of the gas. Here, the area of the cross-section orthogonal to the transporting direction 3c in the furnace is decreased gradually along the transporting-direction 3c so that when a gas having a certain initial velocity is introduced into the furnace, the gas is allowed to proceed with a gradually increasing velocity, and consequently, the gas can be quickly carried to a farther position.

FIG. 3, which shows the range 3e in FIG. 1, indicates a state of a gas flow when the gas is discharged from the furnace. FIG. 3 shows a gas introducing surface 5a and velocity vectors 5b of the gas. Here, the area of the cross-section orthogonal to the transporting direction 3c in the furnace is increased gradually along the transporting direction 3c so that when a gas having a certain initial velocity is introduced into the furnace from the left side, the gas is allowed to proceed with a gradually decreasing velocity, and consequently, the gas can be efficiently discharged by a discharging mechanism (not shown) placed on the right side in the furnace.

Here, in FIGS. 1, 2 and 3, the area of the cross-section of the furnace is varied by changing the angle of each of right and left wall faces with respect to the transporting direction 3c of the object 3b; however, the angle of each of upper and lower wall faces may be changed.

Moreover, depending on the necessity in the heating treatment process, a zone having no change in cross-section may be formed, or only a zone having an increasing cross-sectional area along the proceeding direction, or only a zone having a decreasing cross-sectional area along the proceeding direction, may be formed in the furnace.

In accordance with the present invention, by changing the inner shape of the furnace itself without increasing the amount of a gas to be used or enhancing the performance of the gas-supplying and discharging mechanisms, it is possible to carry out gas-supplying and discharging processes efficiently without loss of energy. In principle, the law of fluid continuity is applied so that, since the product of the area of the cross-section orthogonal to the transporting direction 3c of the object 3b and the velocity at which the gas passes through the cross-section is equal at any cross section, the velocity is adjustable by changing the cross-sectional area.

For example, in an attempt to allow the gas to flow more quickly from a certain position in the furnace to a farther position, the area of the cross-section of the furnace can be decreased gradually from the introducing position to the target position. For example, in principle, in an attempt to increase the velocity at a target position two times faster than that at an introducing position, the cross-sectional area at the target position can be made ½ of the cross-sectional area at the introducing position. With this arrangement, gas-supplying can be carried out efficiently by using small energy.

Moreover, in an attempt to positively discharge a burnt gas flowing through the furnace at a certain position inside the furnace, the cross-sectional area can be gradually increased from the position at which the gas is generated to the discharging position. For example, in principle, in an attempt to decrease the velocity at the discharging position to ½ of the velocity at the generating position, the cross-sectional area at the discharging position is made two times larger than the cross-sectional area at the generating position. Thus, since the velocity of the burnt gas declines naturally, it becomes possible to positively carry out discharging, while preventing the leakage of exhaust gases.

EXAMPLES

The following description will discuss the present invention in detail based upon examples shown in the drawings. However, the present invention is not intended to be limited by the examples.

Figure 4:
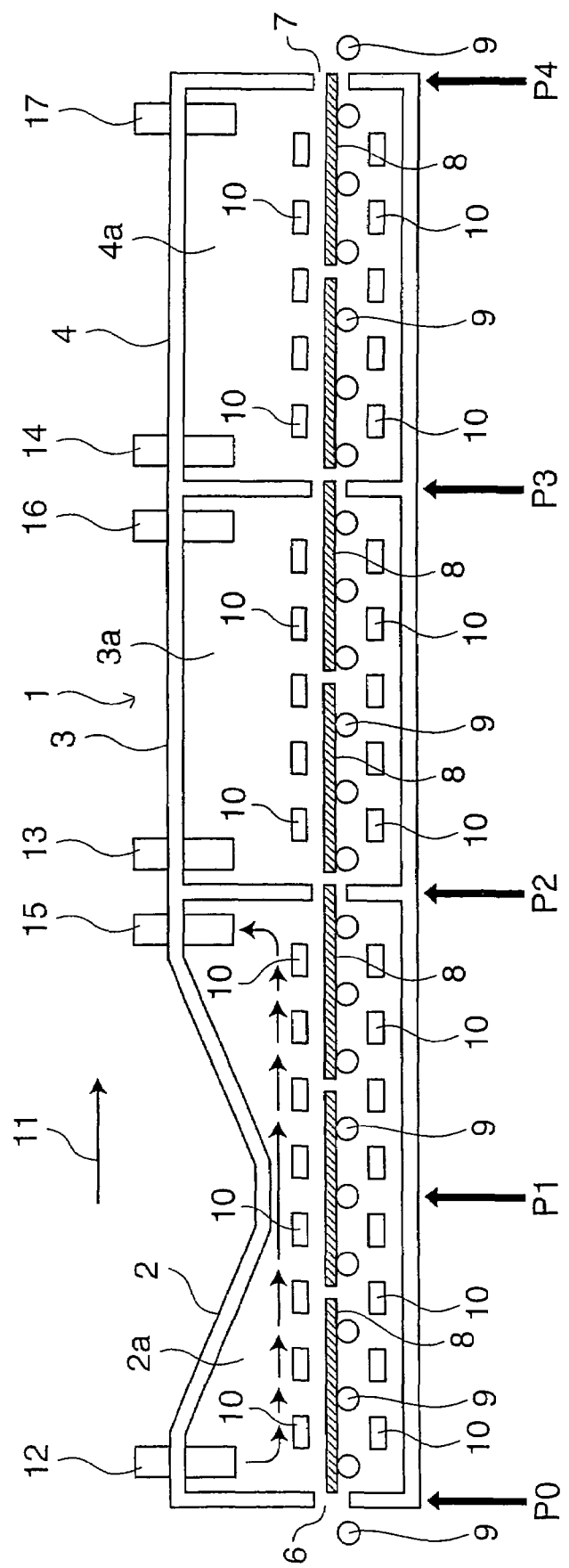
FIG. 4 is an explanatory drawing that shows a structure of one embodiment in accordance with the present invention.

FIG. 4 is an explanatory drawing that shows a structure of a heat treatment apparatus in accordance with the present invention. As shown in this Figure, the heat treatment apparatus is provided with a heating furnace 1. The heating furnace 1 has a furnace chamber 2 serving as a temperature-raising unit, a furnace chamber 3 serving as a temperature-retaining unit and a furnace chamber 4 serving as a temperature-lowering unit. The furnace chambers 2, 3 and 4 are respectively provided with heating spaces 2a, 3a and 4a having a tunnel shape, and are connected in series with one after another.

In the heating furnace 1, there are installed a plurality of transporting rollers 9 serving as a transporting unit that transports an object 8 brought from an inlet port 6 to an outlet port 7 through the heating spaces 2a, 3a and 4a, and a plurality of heaters 10 serving as a heating unit that heats the object to be heated 8, which is being transported, from above as well as from below.

The furnace chambers 2, 3 and 4 are respectively provided with gas-supplying pipes 12, 13 and 14 serving as gas-flow generating units that respectively form gas flows flowing in a transporting direction (indicated by arrow 11) of the object 8 in the heating spaces 2a, 3a and 4a, as well as exhaust pipes 15, 16 and 17.

As shown in FIG. 4, the heating furnace 1 has a structure in which: the inlet port 6 is placed at position P0, a border wall between the furnace chambers 2 and 3 is placed at position P2, a border wall between the furnace chambers 3 and 4 is placed at position P3, and the outlet port 7 is placed at position P4.

Here, the heating space 2a in the furnace chamber 2 serving as the temperature-raising unit is narrowed gradually in its cross-sectional area orthogonal to the transporting direction (indicated by arrow 11) of the object 8 from the position of the gas-supplying pipe 12 along the transporting direction of the object 8, and is minimized at center position P1, and is then made larger gradually to return to its original size at the position of the exhaust pipe 15.

Here, the heating space 3a of the furnace chamber 3 serving as the temperature-retaining unit and the heating spaces 4a of the furnace chamber 4 serving as the temperature-lowering unit are not changed in their cross-sectional areas orthogonal to the direction of arrow 11, and maintained at constant sizes.

Figure 5:
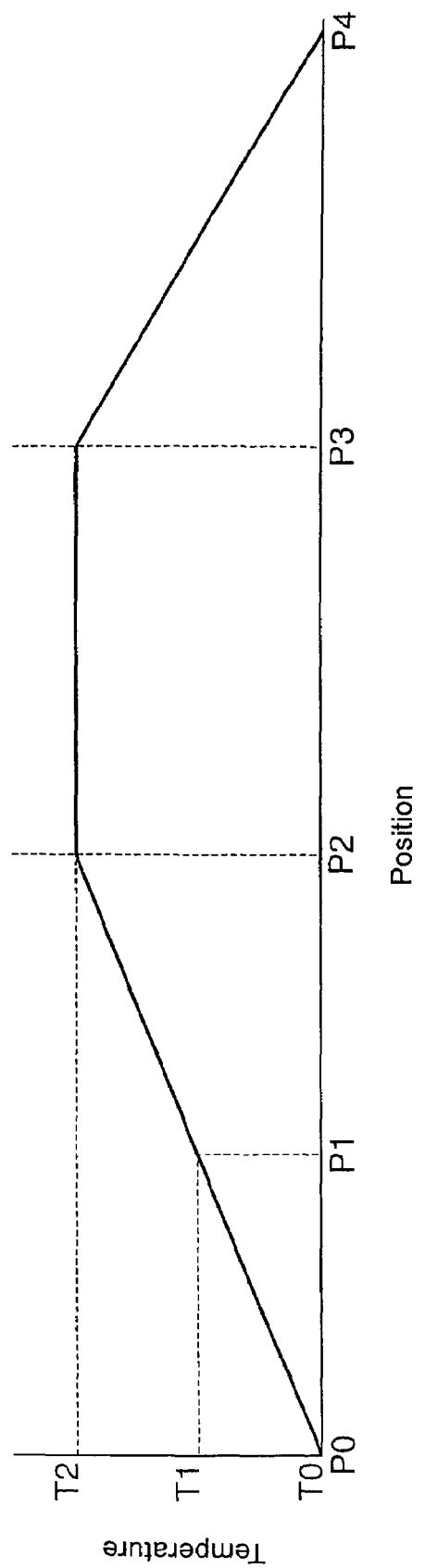
FIG. 5 shows a temperature profile of the embodiment in accordance with the present invention.

FIG. 5 shows one example of a temperature profile of the object 8 in the heating furnace 1.

As shown in FIG. 5, when the object 8 is carried into the furnace chamber 2, it has a temperature T0 (normal temperature) at position P0. During the transportation in the furnace chamber 2, it is heated to a temperature T2 at position P2. Next, during the transportation from position P2 to P3 in the furnace chamber 3, it is maintained at a constant temperature T2. Next, during the transportation from position P3 to P4 in the furnace chamber 4, the temperature T2 is cooled to the temperature T0. In this manner, the heat treatment required for the object 8 is carried out.

Figure 6:
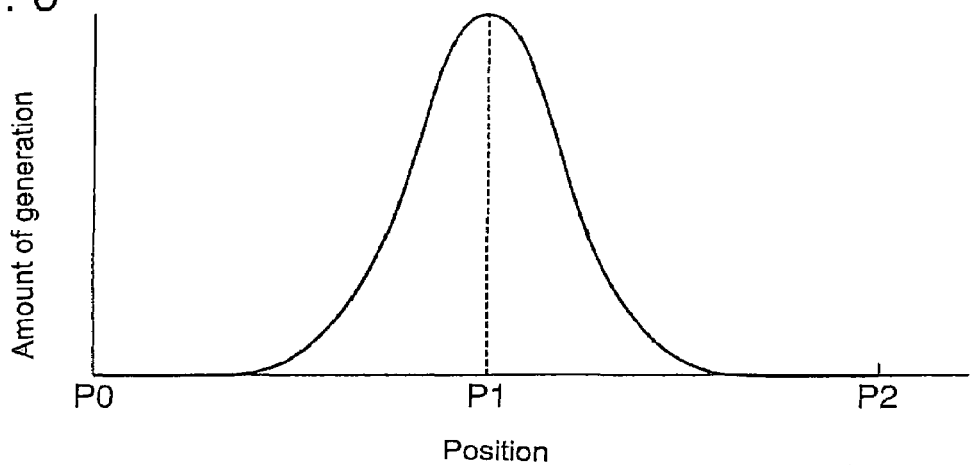
FIG. 6 is a graph that shows the amount of generation of burnt gas of the embodiment in accordance with the present invention.
Figure 7:
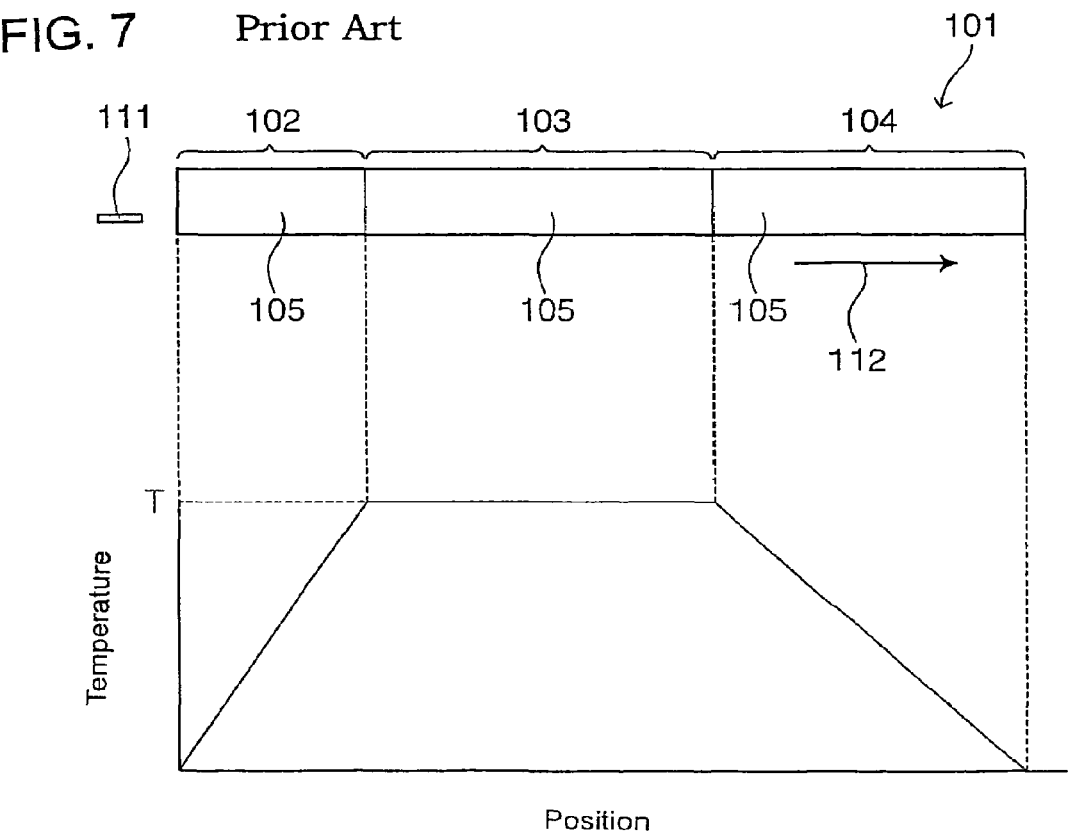
FIG. 7 is an explanatory drawing that shows the prior art.
Figure 8:
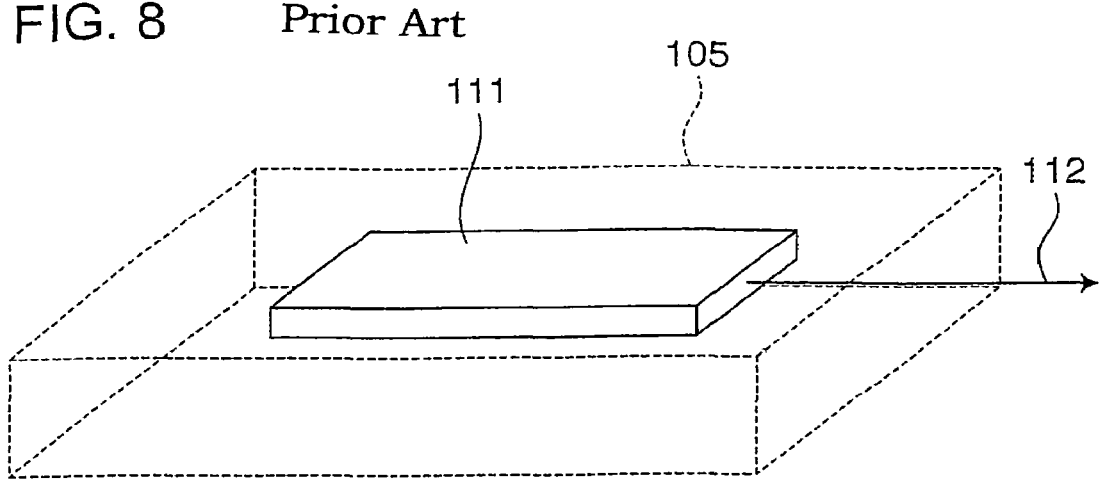
FIG. 8 is an explanatory drawing that shows an essential portion of the prior art.

FIG. 6 is a graph indicating an amount of gases generated from the object 8 per unit time, when the object 8 is heated in the furnace chamber 2.

FIGS. 5 and 6 indicate that when the object 8 reaches position P1, the temperature of the object 8 is raised to a temperature T1 and at this time, the amount of gases generated from the object 8 has a maximum value.

When the objects 8 are successively carried into the heating furnace 1 through the inlet port 6 (position P0), these are transported toward the outlet port 7 in one row by the transporting rollers 9. The respective objects 8 are successively heated in the furnace chamber 2. Moreover, when reached position P1 as indicated in FIGS. 5 and 6, the temperature of the respective objects 8 is raised to T1, with the result that the maximum amount of the gases is generated.

As shown in FIG. 4, air is supplied to the heating space 2a through the gas-supplying pipe 12, and discharged from the exhaust pipe 15. In other words, an air flow is formed inside the heating space 2a in the transporting direction of the object 8.

Here, the cross-sectional area orthogonal to arrow 11 in the heating space 2a is the largest in the vicinity of the gas-supplying pipe 12 and the exhaust pipe 15, and is also the smallest at position P1. Therefore, as shown in FIG. 4, the velocity vectors of the air flow become gradually greater from the vicinity of the gas-supplying pipe 12 toward position P1 to become the greatest at position P1, and then become gradually smaller to become the smallest at the vicinity of the exhaust pipe 15.

Therefore, the generated gases the amount of which is the greatest at position P1 are carried by the air flow that becomes the fastest at position P1, and drawn toward the exhaust pipe 15 efficiently.

The generated gases, thus drawn, are gradually decreased in their velocity, and efficiently discharged from the exhaust pipe 15 together with the air flow having a low velocity in the vicinity of the exhaust pipe 15.

Therefore, since the generated gases hardly intrude into the next adjacent furnace chamber 3, it is possible to prevent the generated gases from contaminating the object 8.

In other words, in this embodiment, the cross-sectional area of the heating space is made minimum in accordance with the position at which a largest amount of the gases is generated.

Here, the object 8 from which the generated gases have completely been generated in the furnace chamber 2 is maintained at the temperature T2 in the furnace chamber 3, and then cooled off to normal temperature T0 in the furnace chamber 4; thereafter, this is discharged through the outlet port 7, thereby completing the heat treatment process.

What is claimed is:

1. A heat treatment apparatus comprising:
a heating furnace including a tunnel-shaped heating space for heating an object to be heated, the heating space having an inlet port and an outlet port formed at both ends thereof;
a transporting unit transporting the object to the outlet port when the object is brought into the heating space through the inlet port;
a heating unit heating the object that is being transported; and
a gas-flow generation unit comprising a gas introducing unit disposed near the inlet port to introduce a gas into the heating space and a gas discharging unit disposed near the outlet port to discharge the gas from the heating space and thereby forming a gas flow that flows in a transporting direction of the object in the heating space, wherein the heating space has a cross-section orthogonal to the transporting direction of the object, and the cross-section is gradually decreased in area from the inlet port to a predetermined position in the heating space and is gradually increased in area from the predetermined position toward the output port.

2. The heat treatment apparatus according to 1, wherein the object is an object that generates a gas when heated, and the object generates a maximum amount of gas at the predetermined position.

3. A heat treatment apparatus comprising:
a heating furnace provided with a first furnace chamber, a second furnace chamber and a third furnace chamber that are connected in series with one after another,
the first furnace chamber including:
 a tunnel-shaped heating space;
 an inlet port and an outlet port for an object to be heated, the inlet and outlet ports formed at both ends of the heating space;
 a transporting unit transporting the object from the inlet port to the outlet port;
 a heating unit heating the object that is being transported; and
 a gas-flow generation unit comprising a gas introducing unit disposed near the inlet port to introduce a gas into the heating space and a gas discharging unit disposed near the outlet port to discharge the gas from the heating space, and thereby forming a gas flow that flows in a transporting direction of the object in the heating space,
wherein each of the first, second and third furnace chambers has a cross-section orthogonal to the transporting direction of the object and the cross-section of the first furnace chamber is gradually decreased in area from the inlet port to a predetermined position in the first furnace chamber and is gradually increased in area from the predetermined position toward the outlet port of the first furnace chamber, and each cross-section of the second and third furnace chambers is substantially constant in area along the transporting direction.

4. The heat treatment apparatus according to claim 3, wherein the object is an object that generates a gas when heated, and the object generates a maximum amount of gas at the predetermined position.

5. The heat treatment apparatus according to claim 3, wherein the first furnace chamber is a temperature-raising unit that raises the object in temperature, the second furnace chamber is a temperature-retaining unit that retains the object constant in temperature, and the third chamber is a temperature-lowering unit that lowers the object in temperature.

6. An apparatus comprising:
a furnace having a heating space through which an object is transported in a transporting direction, and having a gas flow introduced to the heating space and flowing through the heating space in the transporting direction and thereafter being discharged from the heating space, to thereby heat the object as the object is transported through the heating space, wherein
the heating space has a cross-section orthogonal to the transporting direction,
the cross-section gradually decreases in area from where the gas flow is introduced to the heating space to a predetermined position in the heating space so that gas of the gas flow having an initial velocity proceeds toward the predetermined position with a gradually increasing velocity, and
the cross-section gradually increases in area from the predetermined position to where the gas flow is discharged from the heating space so that the gas of the gas flow proceeds from the predetermined position with a gradually decreasing velocity.

7. An apparatus as in claim 6, wherein
the object is an object that generates gas when heated, and
the furnace heats the object at temperatures which cause a maximum amount of gas to be generated by the object at the predetermined position,
the generated gas thereby being carried by the gas flow.

* * * * *

UNITED STATES PATENT AND TRADEMARK OFFICE
CERTIFICATE OF CORRECTION

| | | |
|---|---|---|
| PATENT NO. | : 7,568,914 B2 | |
| APPLICATION NO. | : 11/641714 | |
| DATED | : August 4, 2009 | |
| INVENTOR(S) | : Okano | |

It is certified that error appears in the above-identified patent and that said Letters Patent is hereby corrected as shown below:

Column 7, Line 7, change "1," to --claim 1,--.

Signed and Sealed this

Twentieth Day of October, 2009

David J. Kappos
*Director of the United States Patent and Trademark Office*